Patented Dec. 30, 1930

1,787,193

UNITED STATES PATENT OFFICE

AUGUSTUS H. FISKE, OF WARREN, RHODE ISLAND, ASSIGNOR TO RUMFORD CHEMICAL WORKS, OF PROVIDENCE, RHODE ISLAND, A CORPORATION OF RHODE ISLAND

LEAVENING PREPARATION

No Drawing.   Application filed July 2, 1929.   Serial No. 375,595.

In the manufacture of baking preparations of the chemical type such as self rising flour mixtures, as well as baking powders, the matter of keeping quality is of the utmost importance.

Such articles in the course of merchandising or use are held under more or less unfavorable conditions in spite of all caution on the part of the manufacturer or purchaser.

In any moistened reacting material ordinary atmospheric condition becomes ultimately deleterious so that the "keeping" quality is a very necessary feature of any such product.

In chemical leavening preparations and products including such an ingredient this quality is imperative.

Heretofore the ultimate effect of a minute apparently inactive ingredient in a chemical reactant made up of a preponderating mass of active material has never been studied in this connection.

It has been supposed that food products must be uniform throughout and a variation from this standard of absolute uniformity was not desirable. The theory has been held that food products should not contain any element not absolutely necessary to the immediate apparent function of the material, substances or mixture.

In the manufacture of these chemical leavening preparations certain elements have always been included because of incidental occurrence in the material sources.

One of these incidents of manufacture of chemical leavening preparations especially in those of phosphatic origin has been small amounts of metallic elements, notably of iron.

This has been improperly thought of as inert and unnecessary. Certain processes have been devised to avoid or to remove it as far as possible.

I have found that the small amounts of iron if embodied in the acid ingredient of the leavening preparation or mixture are in no wise undesirable, but actually have a utility of considerable importance. In fact, I have found that by augmenting the iron of natural occurrence that I am able materially to increase the keeping properties of chemical leavening preparations which will be highly desirable for self-rising flour mixtures.

To render this effective, however, it is necessary to observe certain factors especially in the manufacture of mono-calcium phosphate. Where this is produced from the raw material as above stated there is usually present a small amount of iron. Where the bone or mineral phosphate is dissolved in sulphuric acid to prepare phosphoric acid, a certain amount of iron present in the raw material will be dissolved and even after refining and so-called purification it will be found in the finished product. Where the phosphoric acid is prepared by a smelting process, the pregenetic iron present in the original raw material may be partly eliminated due to the volatilization of the phosphoric acid, but even in the product from this process iron will always be found.

The phosphoric acid obtained by either of these methods is treated with lime and if prepared according to common commercial practice may contain ½ of 1% of iron calculated as $Fe_2O_3$ which is found in the finished monocalcium acid phosphate produced from it. The next usual step in such a process after preparing, drying and grinding the monocalcium phosphate containing the above minute quantity of iron is to mix it with bicarbonate of soda and a starchy body to form a leavening mixture. A characteristic formula for a mixture of this character is as follows:

| | Lbs. |
|---|---|
| Bicarbonate of soda | 30 |
| Phosphate | 37½ |
| Starchy material | 32½ |

In explaining my present invention I will describe certain tests made with a mixture prepared on the above basis so that my results may be readily verified. I have prepared a series of mixtures on the above formula but have added various amounts of iron by dissolving metallic iron or soluble iron salts in the phosphoric acid just before mixing it with the lime. In this way I have obtained a series of monocalcium phosphates containing varying amounts of iron. After making leavening mixtures of these samples of monocalcium phosphate I have treated them to determine their relative keeping quality. In such tests I have proceeded as follows:

Small amounts of each mixture are carefully weighed out and exposed in a moist atmosphere under exactly the same conditions but for different lengths of time. I then determine the amount of residual leavening gas remaining in each sample. From this I have been able to obtain an accurate measure of the relative stability of the different samples under commercial conditions. It is obvious that the mixture which contains the largest amount of residual gas at the end of a severe test of this nature will be the mixture which will have the best keeping qualities under commercial conditions.

In the following tabulation I have given the percentage of iron present in combination in the monocalcium phosphate prepared as above described placed above the figure reporting the relative stability. It will be noted that if we take the mixture containing the least combined iron and represent its relative keeping quality by the figure 1000 we have a distinct improvement in keeping quality as the amount of iron is increased in the combination.

| $Fe_2O_3$ | 0.32% | 1.20% | 1.68% | 2.85% | 3.48% |
|---|---|---|---|---|---|
| Relative stability | 1000 | 1232 | 1278 | 1431 | 1463 |

The percentage of this iron may be carried above that stated to any reasonable extent it being only necessary to note that when more than certain percentages of this iron are present it will begin to exert a slight darkening effect on the color of the monocalcium phosphate.

This improvement in keeping quality of leavening preparations notably in so-called self-rising flour is very important. The tendency to deteriorate after standing for a long period on the grocer's shelf has been marked and the exposure of self-rising flour in domestic use has been known to produce serious dissatisfaction. It is obvious that manufacturers of these products need not go to such great expense to obtain immediate sales as soon as the goods are received by the retailer and this is a great advantage. Under my invention the self-rising flour containing monocalcium phosphate prepared according to my invention may be kept for considerable longer time without usual deterioration.

The relation of the iron to the monocalcium phosphate seems to come about through the formation of a slow acting iron compound of unknown composition. In addition to its apparent reaction retardation or as a phase of the improved keeping quality of the preparation in which this material is used I point out the probable effectiveness of the natural tendency of iron compounds to form hydrolytic salts and thus remove moisture from the field of the reactive media. This is particularly true where additional amounts of iron are added. I have found that iron should be present at the time of formation of the monocalcium phosphate and for this purpose is best dissolved in the acid.

My process for augmenting the iron in the leavening mixtures as above described while capable of variation in practice is advantageous on account of its simplicity. It is impossible to state the exact amounts which will give the best results for any particular condition but my tabulation above will indicate the relative effect so that the amount needed to produce any desired result can be readily determined. On an average from two to three percent of iron in the acidic ingredient on the basis of $Fe_2O_3$ will represent a leavening preparation of high keeping quality and when mixed as a part of a prepared or self-rising flour will cause that mixture to have a far better keeping quality than if the combined iron were not present.

It is important to note in connection with my invention that the iron is not mixed with the mono-calcium phosphate in a physical manner. It is combined by my method of dissolving it in the phosphoric acid in such an intimate chemical manner that it cannot react with any substances unless there be a reaction of the monocalcium phosphate as well. In other words, any substance or material in the presence of the leavening mixture which does not react or is not affected by the ordinary variety of mono-calcium phosphate will not be influenced in any way by the iron which is dissolved in or combined chemically in my improved phosphate. It will be thus seen that a manufacturer of self-rising flour will not be putting into his mixture my new substance when he uses monocalcium phosphate prepared according to my invention, but will be using material just like ordinary phosphate with all the usual desirable properties of the best known quality of this material, but in addition it will have the improved keeping quality imparted to it by the added iron intimately and chemically combined and dissolved in the phosphate itself.

It is well known to students of nutrition that the addition of small amounts of iron to the diet is desirable, and that iron is absolutely essential in a nutritional way to the human organism. It will be obvious, therefore, that my invention has a tendency to improve the nutritional value of the leavening preparation in which it is used.

What I therefore claim and desire to secure by Letters Patent is:

1. In a leavening preparation, gas forming reactants including a phosphate having added iron chemically combined therein in excess of normal residuum.

2. In a leavening preparation, gas forming reactants including a phosphoric acid member having iron chemically combined therein above two per cent.

3. The method of improving the keeping quality of a leavening preparation including a phosphoric acid ingredient which consists in augmenting its combined iron content.

4. The method of improving the keeping quality of a leavening preparation including a phosphoric acid ingredient which consists in augmenting its iron ingredients above three per cent.

5. The method of improving the keeping quality of a leavening preparation including a phosphate which consists in dissolving a ferruginous material in the phosphoric acid from which the phosphate is manufactured prior to incorporation in the leavening preparation.

In testimony whereof I affix my signature.

AUGUSTUS H. FISKE.